Dec. 17, 1968  J. E. KAUFFMAN  3,417,300
ECONOMY HIGH POWER PACKAGE

Filed Dec. 15, 1965  4 Sheets-Sheet 1

INVENTOR
John E. Kauffman

BY William E. Johnson, Jr.
ATTORNEY

Dec. 17, 1968 J. E. KAUFFMAN 3,417,300
ECONOMY HIGH POWER PACKAGE
Filed Dec. 15, 1965 4 Sheets-Sheet 2

INVENTOR
John E. Kauffman

BY William E. Johnson Jr.
ATTORNEY

INVENTOR
John E. Kauffman
BY William E. Johnson Jr.
ATTORNEY

Dec. 17, 1968   J. E. KAUFFMAN   3,417,300
ECONOMY HIGH POWER PACKAGE
Filed Dec. 15, 1965   4 Sheets-Sheet 4

INVENTOR
John E. Kauffman

BY William E. Johnson, Jr.
ATTORNEY

United States Patent Office 3,417,300
Patented Dec. 17, 1968

3,417,300
ECONOMY HIGH POWER PACKAGE
John E. Kauffman, Richardson, Tex., assignor to Texas Instruments Incorporated, Dallas, Tex., a corporation of Delaware
Filed Dec. 15, 1965, Ser. No. 514,015
3 Claims. (Cl. 317—234)

ABSTRACT OF THE DISCLOSURE

Disclosed is a semiconductor device encapsulated in an economic package. The package comprises, in addition to the semiconductor device, one member forming the actual enclosure of the device and the second member serving the multiple purposes of mounting, heat sinking and completing the header outline. For flexibility and economy, the first enclosure member is only press fitted into the second mounting member such that a mounting member which is in the shape of a TO-3 header or a stud header can be used.

---

This invention relates to semiconductor devices having an improved means for mounting. More particularly it relates to the fabrication of semiconductor devices having an improved means for mounting said devices to a heatsink while providing an optimized path for thermal transfer.

Semiconductor devices, especially those classified as power transistors, have a self-induced heating due to the power dissipated during device operation. This heating effect, generally caused by a power in the range of less than a watt to several hundred watts in the present technology, must be quickly transferred to a heatsink to prevent an overheating of the active junction or junctions and thus a subsequent self-destruction. In transistors, the highest amount of heat is generated at the collector-base junction; therefore, the collector is normally mounted to a metallic header, for example, copper, which has a high coefficient of thermal conductivity. The copper header of the transistor is then mounted to a metal heatsink, for example, copper, for use in a circuit application. However, if the metal header of the transistor is not in intimate contact with the heatsink over a large enough area, the heat from the transistor junction will not be adequately transferred to the heatsink, resulting in the desetruction of the device. A typical power transistor header widely used in the art is the TO-3 (commonly referred to as a "diamond" header). This prior art header, along with many others commonly used, are plagued by their inherent lack of flexibility and therefore a poor thermal transfer path. Because the header is rigid, an application of pressure at one end of the header causes the other end to "bow-up," the TO-3 package in particular having a mounting hole at each end of the two-ended header. The other types of power transistor headers all have the problem of the header not being intimately connected to the heatsink.

Another problem which has been prevalent in the semiconductor art has been that of the nonflexibility of the device itself, both the problem being experienced by both the consumer and the manufacturer. The nonflexibility can again be exampled by the conventional TO-3 header, wherein the semiconductor wafer is mounted on a diamond-shaped header, the lid or "can" is welded to the header, and the device is ready for the consumer in only that one configuration. During the fabrication of the device, the manufacturer has no freedom as to the final product once the semiconductor wafer is mounted on the header.

Still another problem associated with semiconductor devices, especially those packages in "stud" housings, is that of the damaging force which is applied to the semiconductor wafer if an excessive torque is applied to the stud while mounting the device to a heatsink.

It is therefore an object of the invention to provide a semiconductor device having an improved means for mounting said device to a heatsink.

It is yet another object of the invention to provide a semiconductor device having an improved means for transferring the heat of the transistor to an external heatsink.

It is yet another object of the invention to provide a semiconductor device which has an improved mechanical flexibility.

It is still another object of the invention to provide a semiconductor device which has an increased resistance to the detrimental effect of torque mounting pressure.

These and other objects and features of the invention will be readily understood from the following detailed description when read in conjunction with the appended claims and attached drawings, in which:

The invention, in brief, comprises a semiconductor wafer, for example, a power transistor, embedded within an epoxy-filled copper cup, wherein the cup has an upper surface area which is rounded or beveled down a given distance on the sides and has a lower cylinder-shaped portion. The semiconductor in the cup is supplied with a variety of mounting brackets or, in the alternative, the cup can be pressed into certain of the brackets in the fabrication process by the manufacturer. This flexibility allows the consumer to purchase the cup and mounting brackets separately and thus not be concerned over having an inventory of stud devices and an engineering need for TO-3 devices or vice versa.

Figure 1:
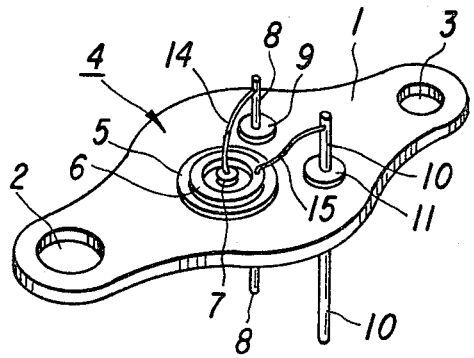
FIGURE 1 illustrates a pictorial view of a prior art uncanned TO-3 header having a semiconductor wafer mounted thereon.
Figure 2A:
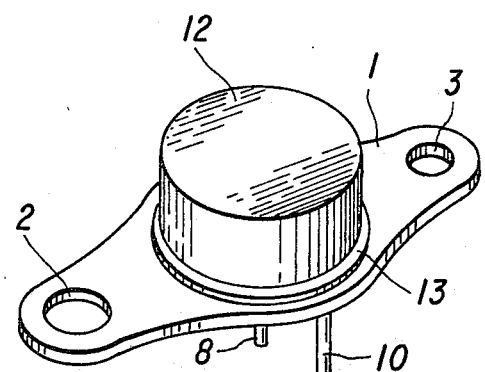
FIGURES 2a and 2b illustrates a pictorial view of the header of FIGURE 1 having a can welded to said header.
Figure 2B:
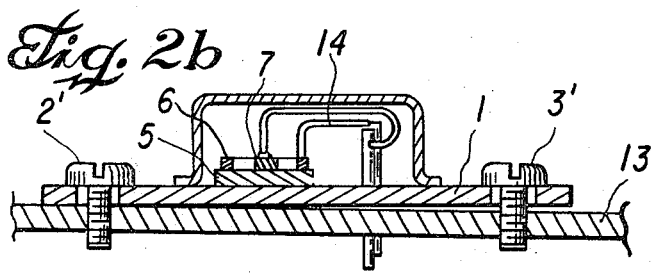

For a more detailed description, with specific reference to FIGURE 1, there is illustrated a conventional TO-3 header (for example, copper), having mounting holes 2 and 3 in opposite ends of the header. An alloy-type conventional transistor 4, having a collector region 5, an alloyed base ring 6 and an emitter dot 7 is mounted in a centralized region of the header 1, for example, by soldering the collector region 5 directly to the header or to a thermally matching interlayer (not illustrated) of Kovar. The base ring 6 is then connected by a lead wire 15 to a base electrode (post) 10 which passes through glass eyelet 11 to the opposite side of the header. In a like manner, the emitter dot is connected to the post 8 by lead 14. FIGURE 2a illustrates a metal can member 12 welded to the header 1 along a flange member 13 to complete the fabrication. It should be appreciated, that when mounting this prior art device to a metal heatsink 13 in FIGURE 2b, using metal screw 2' through mounting hole 2 and metal screw 3' through mounting hole 3, the header 1 may not always make intimate contact with the heatsink 13. This results in an ineffective thermal transfer path between the collector wafer 5 and the heatsink 13, resulting in the destruction of the transistor. In FIGURE 2b the gap between the header 1 and heatsink 13 is admittedly exaggerated for purposes of illustration, but any gap at all, even though extremely small, will prevent there being an effective path for a thermal transfer between the transistor 4 and the heatsink 13.

Figure 3:
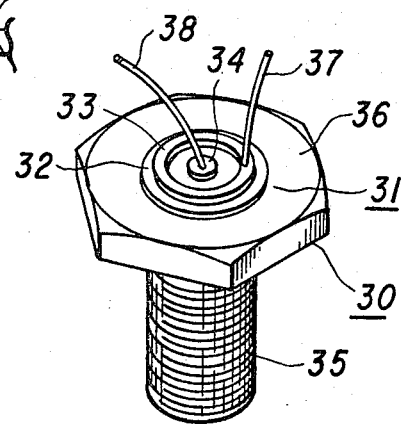
FIGURE 3 illustrates a pictorial view of a prior art uncanned stud package header having a semiconductor wafer mounted thereon.

FIGURE 3 illustrates a pictorial view of a conventional stud-type header 30 having a mounting stud 35. A conventional alloy-type transistor 31, having a collector region 32, an alloyed base ring 33 and emitter dot 34 is mounted to a flat metal surface 36 of the header 30, for example, by soldering the collector region 32 to the surface 36. A base wire 37 is connected to the base ring 33 and an emitter wire 38 is connected to the emitter dot 34, both wires being connected, for example, by soldering.

Figure 4:
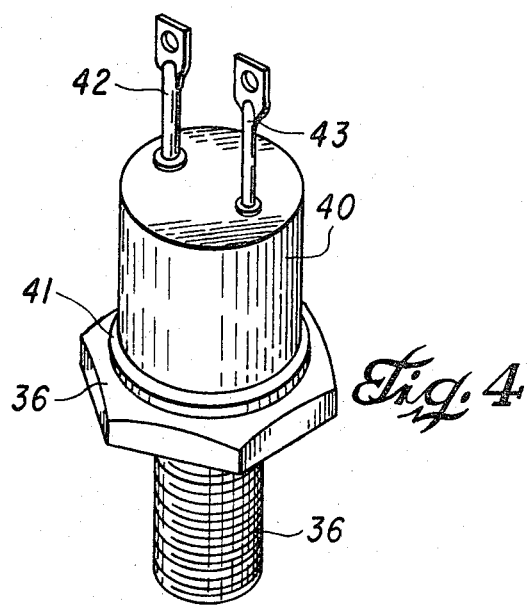
FIGURE 4 illustrates a pictorial view of the stud header of FIGURE 3 having a can welded to said header.

FIGURE 4 illustrates a metal can member 40, for example, steel, welded along the flange member 41 to the metal surface 36, for example, copper. The base wire 37 of FIGURE 3 is placed inside the metal tube 43 and the emitter wire 38 is placed inside the metal tube 42. Both tubes 42 and 43 are crimped and welded to secure a good electrical connection between the respective wires and tubes. It should be appreciated that when mounting the device of FIGURE 4 to a heatsink (not illustrated), the torque applied to the stud member 35 will be imparted to the metal surface 36, resulting in a deformation of said surface, and consequently the transistor 31 is often damaged.

Figure 5:
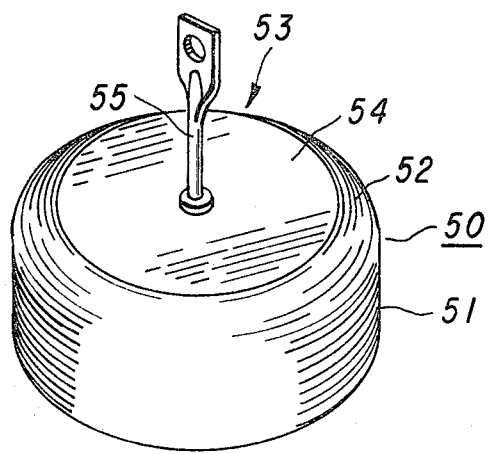
FIGURE 5 illustrates a pictorial view of a single lead semiconductor device mounted in a cup according to the invention.

FIGURE 5 illustrates a metal cup member 50, for example, copper, having straight cylindrical sides 51 and a rounded (beveled) inwardly extending surface 52 at the upper most part of the cup. A semiconductor diode (illustrated in section in FIGURE 7) is mounted to the copper cup, for example by soldering the semiconductor region 56 to the cup, and a metal electrode 55 is connected to the metal region 58 which is evaporated on the semiconductor region 57, the regions 56 and 57 being of opposite conductivity types to form a conventional P–N junction. The semiconductor diode is encapsulated in a glass medium 54. Thus FIGURE 5 illustrates a glass-encapsulated semiconductor diode having the metal cup member 50 as one electrode and the metal lead member 55 as the counter electrode.

Figure 6:
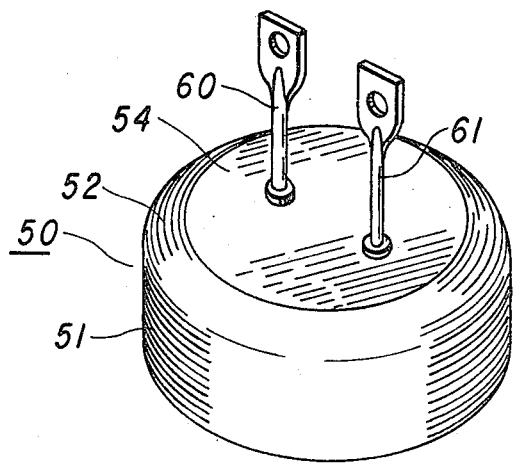
FIGURE 6 illustrates a pictorial view of a multilead, semiconductor device mounted in a cup according to the invention.

FIGURE 6 illustrates another embodiment of the glass-encapsulated semiconductor device within a metal cup, but having a multilead device, for example, a transistor having a base lead 60 and an emitter lead 61.

Figure 7:
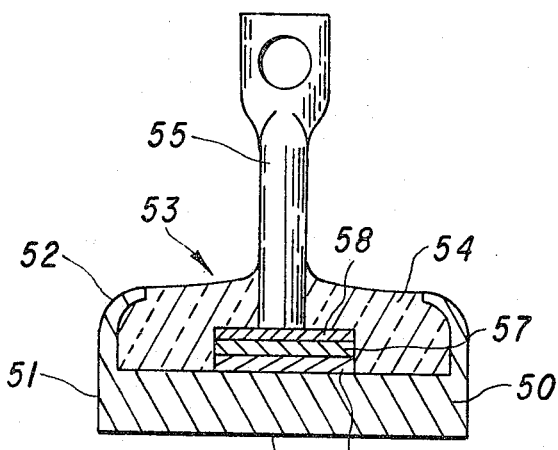
FIGURE 7 illustrates a sectional view of the cup-filled device of FIGURE 5.

FIGURE 7 illustrates a sectional view of the glass-encapsulated semiconductor device within a copper cup 50, the semiconductor region 56 being in intimate connection with the cup and the bottom surface 59 of the cup being flat to mate with a heatsink, the mating to be described in detail hereinafter.

Figure 8A:
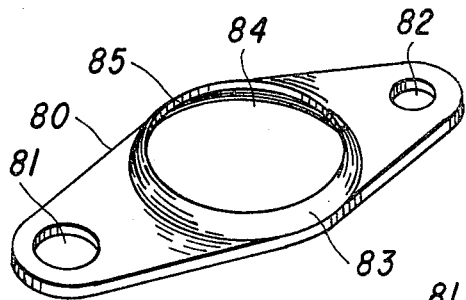
FIGURES 8a and 8b illustrates a pictorial view of a TO-3 type mounting bracket for use with the cup of FIGURE 5 according to the invention.
Figure 8B:
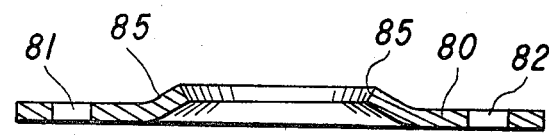

FIGURE 8a illustrates a mounting bracket for use with the cup member such as illustrated in FIGURE 5. The metal bracket, for example, aluminum, is shaped much like the conventional TO–3 header, having mounting holes 81 and 82, but having a cup-receiving member 83. The aluminum bracket is less costly than copper and therein rests an additional feature of the invention. The member 83 has a hole 84 completely through the bracket and is so radiused as to allow a point on the rounded surface 52 of the cup to contact the upper lip 85 of the cup-receiving member. Even if the hole 84 is slightly undersized and the bracket member tip 85 should ride up so high on the rounded surface that the bracket member would not mate flat with the heatsink, there would be no damaging effect. Once the cup member is placed against the heatsink 90, as illustrated in section in FIGURE 9b the bracket member can be rolled about or rotated in any manner without effecting the mated relationship between the bottom of the cup member and the heatsink. Thus, any difference between the pressures applied to tighten the mounting screws 81' and 82' will not effect the thermal transfer path.

Figure 9A:
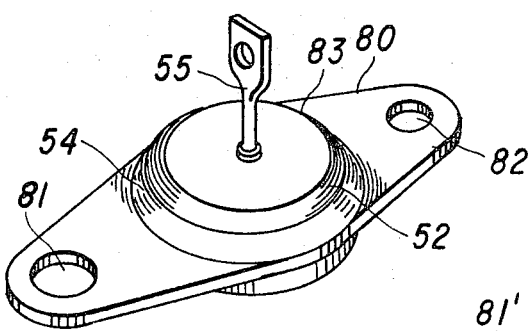
FIGURES 9a and 9b illustrates a pictorial view of the cup of FIGURE 5 mounted in the bracket of FIGURE 8 according to the invention.
Figure 9B:
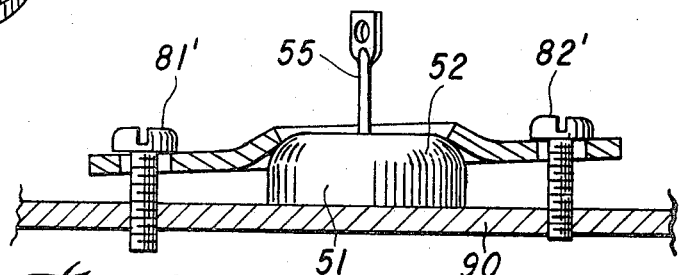
Figure 10B:
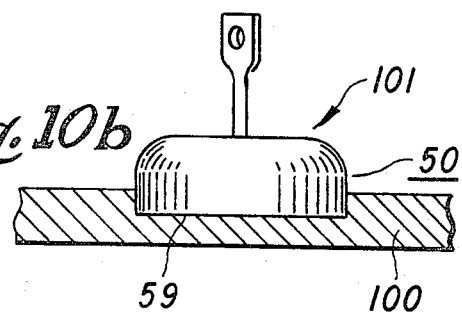
FIGURES 10a and 10b illustrates a pictorial view of a press-in type mounting bracket for use with the cup of FIGURE 5 according to the invention.
Figure 10A:
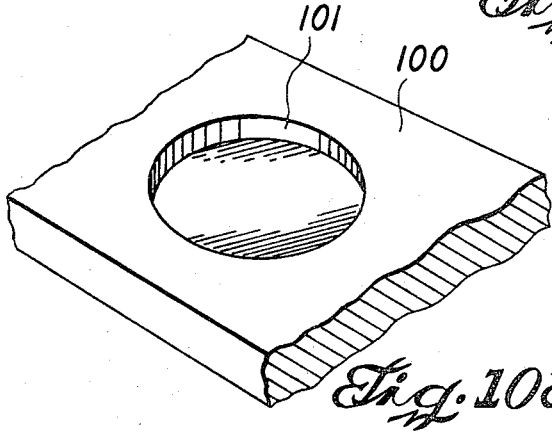
Figure 11:
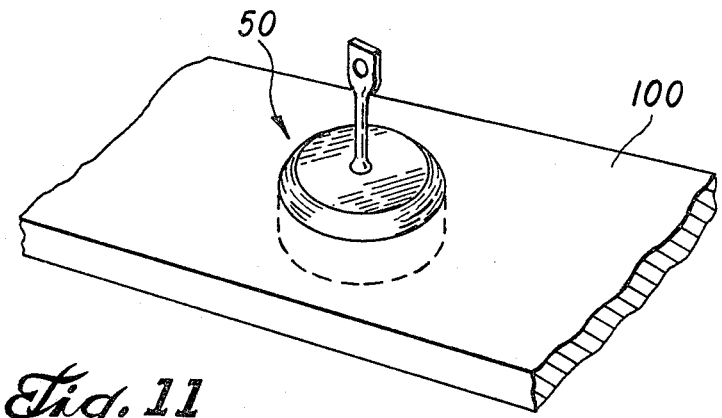
FIGURE 11 illustrates a pictorial view of the cup of FIGURE 5 pressed into the mounting bracket of FIGURE 10 according to the invention.

FIGURE 10 illustrates another embodiment of the invention utilizing the cylindrical wall 51 of the cup 50 illustrated in FIGURE 5. A metal heatsink 100, for example, copper, having a hole of the same diameter as that of the cylindrical wall 51, can be used without using a mounting bracket as illustrated in FIGURE 9. FIGURE 11 illustrates the cup member 50 pressed into the hole 101, the press fit being tight enough to provide mechanical stability and a good thermal transfer path. Hole 101 can go all the way through the heatsink 100, but in the preferred embodiment will not go all the way through in order to provide a seat for the bottom surface 59 of the cup 50, as shown in partially sectioned view in FIGURE 10b. FIGURE 11 illustrates a pictorial view of the cup 50 pressed into the heatsink 100.

Figure 13:
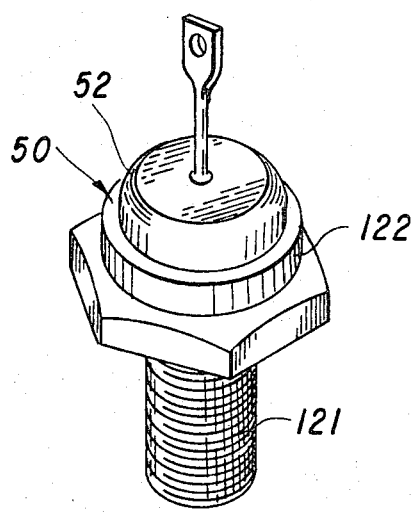
FIGURE 13 illustrates a pictorial view of the cup of FIGURE 5 pressed into the header of FIGURE 12.
Figure 12:
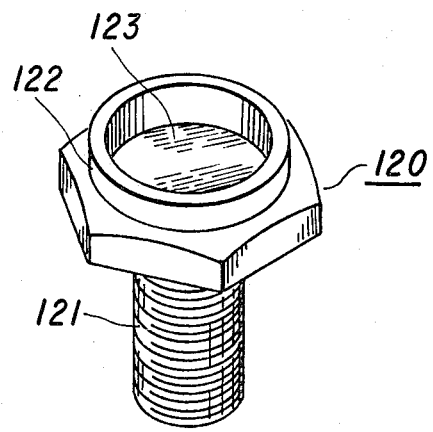
FIGURE 12 illustrates a pictorial view of a press-in type stud header for use with the cup of FIGURE 5 according to the invention.

FIGURE 12 illustrates a stud-type cup-receiving metal header 120, for example, copper, having a hole 123 in the member 122 which has a diameter approximately the same as the cylindrical wall 51 of the cup member 50 illustrated in FIGURE 5. The cup 50 is then press-fitted into the hole 123 to give mechanical stability and provide a good thermal transfer path. The cup 50 can be pressed all the way to bottom out in the hole 123 to provide the maximum heat transfer to the stud, or in the alternative, can be pressed in just short of the bottom to further diminish the possibility of damage due to the torque applied to the stud member 121 during the subsequent mounting step by the consumer. FIGURE 13 illustrates a pictorial view of the cup 50 pressed into the header 120.

Thus there has been illustrated and described how the present invention provides a semiconductor device having flexible mounting means, all of which overcome the problems associated with prior art devices regarding loss of the thermal transfer path during the subsequent mounting step and also the problem of applying a damaging torque to a stud package. The invention also provides the consumer an improved degree of flexibility in mounting means by providing a single cup member along with the less-expensive TO–3 header type mounting bracket and the modified stud header as illustrated in FIGURE 12, along with the simple process of merely press-fitting the cup member into a heatsink as illustrated in FIGURES 10 and 11.

While the invention has been illustrated and described with reference to the preferred embodiments, specifically a diode and an alloy-type transistor, it should be appreciated that any semiconductor device, such as a capacitor, resistor, field effect device, integrated circuit, thin film circuit and the like can be so fabricated, the diode and transistor fabrications being merely illustrative of semiconductor devices which can be packaged according to the invention. For example, a diffused and/or epitaxial device can be substituted for the alloy-transistor structure. It should therefore be appreciated that obvious modifications and substitutions will become apparent to one skilled in the art and the invention is to be limited only by the appended claims.

I claim:
1. A mounted semiconductor device comprising:
   (a) a metal cup member having straight cylindrical sides and a beveled inwardly extending surface on the open end of the cup;
   (b) said semiconductor device mounted to said metal cup member within said open end;
   (c) at least one electrode connected to said semiconductor device and extending out of said open end;
   (d) an insulating medium covering said semiconductor device and at least partially filling said metal cup member;
   (e) a metal mounting member connected to said cup member, the combination of said mounting member and said cup member having the outline of a typical header.
2. The mounted semiconductor device as defined in claim 1, wherein said typical header is a TO-3 header.
3. The mounted semiconductor device as defined in claim 1, wherein said typical header is a stud header.

References Cited

UNITED STATES PATENTS

| | | | |
|---|---|---|---|
| 2,866,928 | 12/1958 | Blundell | 317—234 |
| 2,917,286 | 12/1959 | Deakin | 317—234 |
| 3,047,648 | 7/1962 | Mowatt | 317—234 |
| 3,101,114 | 8/1963 | Katz | 317—234 |
| 3,176,382 | 4/1965 | Dickson et al. | 317—234 |
| 3,188,536 | 6/1965 | Rittmann | 317—235 |
| 3,240,263 | 3/1966 | Stewart | 317—234 |
| 3,297,916 | 1/1967 | Wright | 317—234 |
| 3,328,644 | 6/1967 | Barrling | 317—234 |

FOREIGN PATENTS 70,453  5/1946  Norway.

JOHN W. HUCKERT, *Primary Examiner.*

A. J. JAMES, *Assistant Examiner.*

U.S. Cl. X.R.

317—235; 174—15; 165—80